United States Patent
Brunner

(10) Patent No.: US 9,241,288 B2
(45) Date of Patent: Jan. 19, 2016

(54) METHOD FOR CHANGING THE WIRELESS ACCESS POINT ASSOCIATED WITH A TERMINAL IN A WIFI-DECT WIRELESS TELECOMMUNICATIONS NETWORK

(71) Applicant: Alcatel Lucent, Paris (FR)

(72) Inventor: Frederic Brunner, Illkirch (FR)

(73) Assignee: Alcatel Lucent, Boulogne-Billancourt (FR)

( * ) Notice: Subject to any disclaimer, the term of this patent is extended or adjusted under 35 U.S.C. 154(b) by 62 days.

(21) Appl. No.: 14/358,523

(22) PCT Filed: Oct. 26, 2012

(86) PCT No.: PCT/EP2012/071211
§ 371 (c)(1),
(2) Date: May 15, 2014

(87) PCT Pub. No.: WO2013/072176
PCT Pub. Date: May 23, 2013

(65) Prior Publication Data
US 2014/0321431 A1    Oct. 30, 2014

(30) Foreign Application Priority Data

Nov. 15, 2011  (EP) .................................. 11306489

(51) Int. Cl.
*H04W 4/00*    (2009.01)
*H04W 36/00*   (2009.01)
H04W 48/20     (2009.01)
H04W 88/06     (2009.01)
H04W 88/10     (2009.01)

(52) U.S. Cl.
CPC ...... *H04W 36/0066* (2013.01); *H04W 36/0055* (2013.01); *H04W 48/20* (2013.01); *H04W 88/06* (2013.01); *H04W 88/10* (2013.01)

(58) Field of Classification Search
None
See application file for complete search history.

(56) References Cited

U.S. PATENT DOCUMENTS

| 5,930,712 A * | 7/1999 | Byrne | H04W 36/0066 455/426.1 |
| 2005/0181822 A1* | 8/2005 | Sasaki | H04W 88/06 455/552.1 |

(Continued)

FOREIGN PATENT DOCUMENTS

| JP | 2012-525806 A | 10/2012 | |
| WO | WO 9914971 A1 * | 3/1999 | ......... H04Q 11/0457 |
| WO | WO 2012145706 A1 * | 10/2012 | ............ H04W 36/22 |

OTHER PUBLICATIONS

International Search Report for PCT/EP2012/071211 dated Jan. 16, 2013.

(Continued)

*Primary Examiner* — Chi H Pham
*Assistant Examiner* — Fahmida Chowdhury
(74) *Attorney, Agent, or Firm* — Fay Sharpe LLP

(57) ABSTRACT

This method for changing the radio access point associated with a terminal, within a Wi-Fi-DECT wireless telecommunication network comprising dual-mode Wi-Fi-DECT radio terminals (PP) and Wi-Fi-DECT radio access points (AP1, AP2) connected to a local area network; comprises a step consisting of changing the Wi-Fi-DECT radio access point for the Wi-Fi part of the terminal in question (PP) whenever it is decided to change the Wi-Fi-DECT radio access point for the DECT part of the terminal in question (PP).

6 Claims, 3 Drawing Sheets

(56) References Cited

U.S. PATENT DOCUMENTS

| | | | |
|---|---|---|---|
| 2007/0104218 A1 | 5/2007 | Hassan et al. | |
| 2008/0250142 A1 | 10/2008 | Magnusson et al. | |
| 2010/0080197 A1* | 4/2010 | Kanellakis | H04W 48/18 370/338 |
| 2010/0159898 A1* | 6/2010 | Krzyzanowski | G06F 9/4445 455/414.1 |
| 2010/0279689 A1 | 11/2010 | Tinnakornsrisuphap et al. | |

OTHER PUBLICATIONS

English Bibliography for Japanese Patent Application Publication No. JP2012525806A, published Oct. 22, 2012, printed from Thomson Innovation on May 7, 2015, 4 pp.

PCT Pat. App. No. PCT/EP2012/071211, Written Opinion of the International Searching Authority, mailed Jan. 16, 2013, 9 pp.

European U.S. Pat. No. 11306489, Extended European Search Report, mailed Apr. 5, 2012, 7 pp.

* cited by examiner

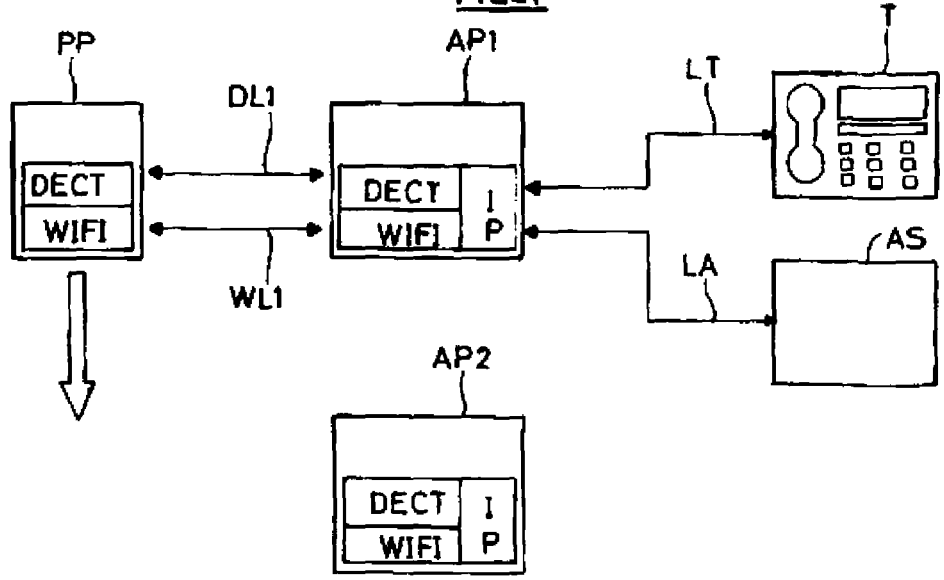
FIG_1
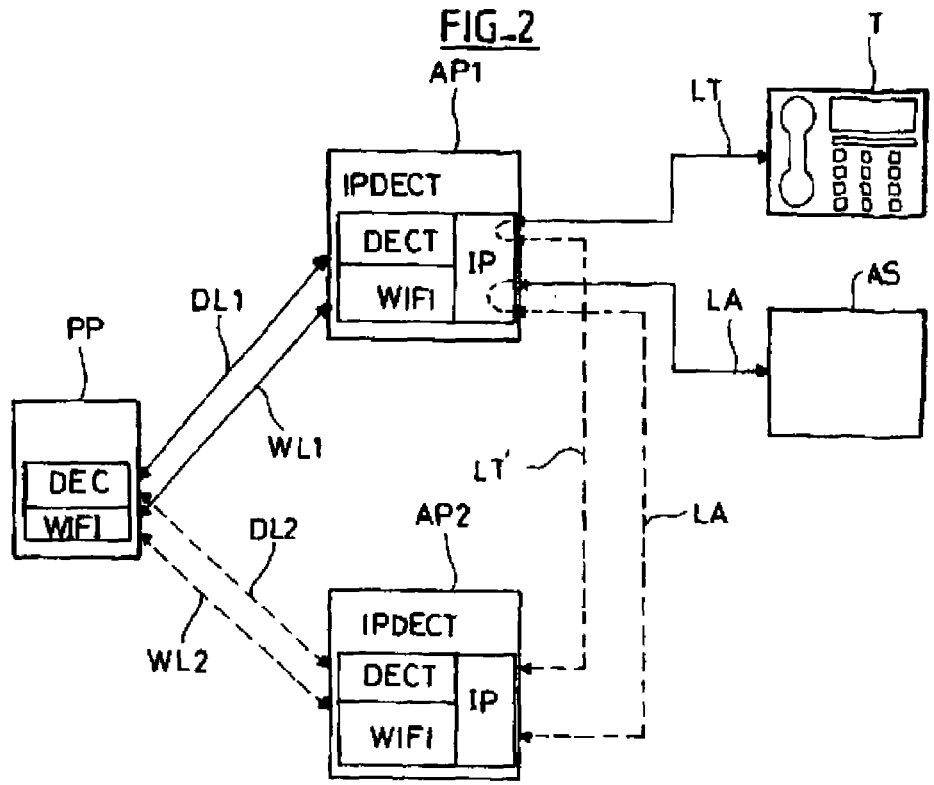
FIG_2

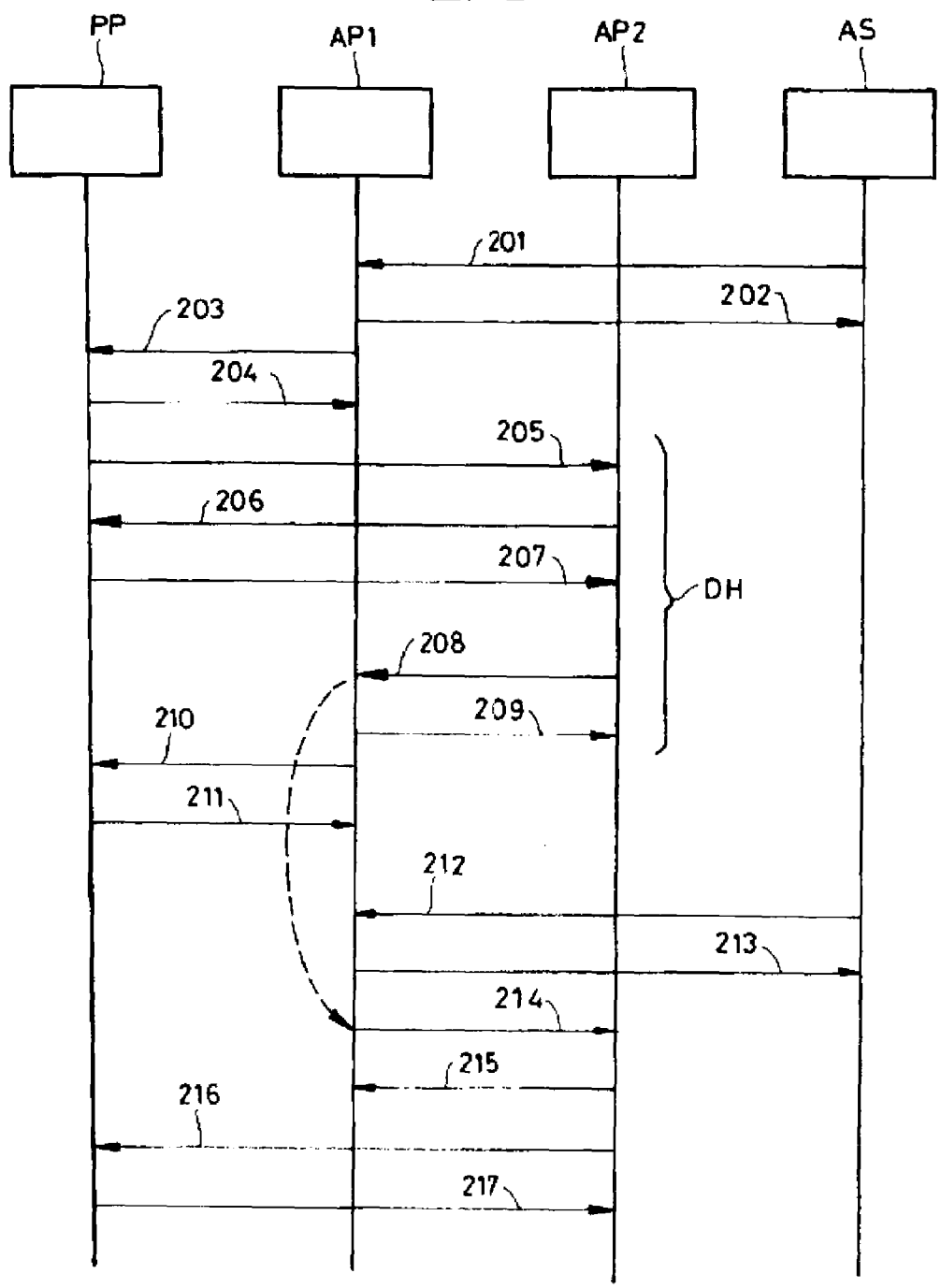

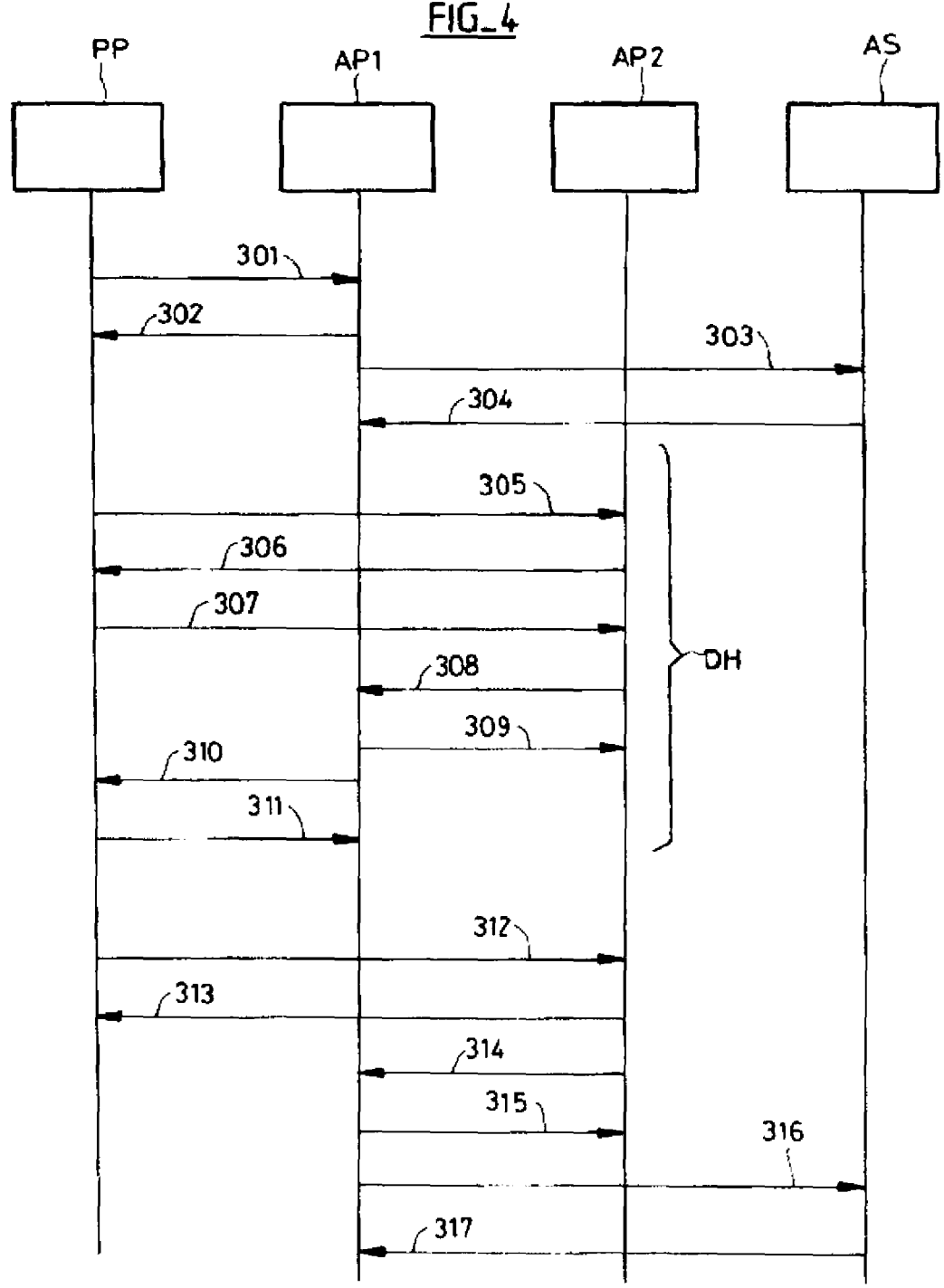

METHOD FOR CHANGING THE WIRELESS ACCESS POINT ASSOCIATED WITH A TERMINAL IN A WIFI-DECT WIRELESS TELECOMMUNICATIONS NETWORK

The invention pertains to a method for changing the radio access point associated with a terminal, in a Wi-Fi-DECT wireless telecommunication network. The invention more particularly relates to dual-mode Wi-Fi-DECT wireless terminals (The Wi-Fi type corresponds to IEEE 802.11 standards, and the DECT type corresponds to ETS 300 175 standards). A dual-mode Wi-Fi-DECT terminal allows a telephone call in DECT mode or Wi-Fi mode, but DECT mode is preferred because it affords the best telephone call quality. A dual-mode Wi-Fi-DECT terminal further allows data transmission in DECT mode or Wi-Fi mode, but Wi-Fi mode is preferred because it affords greater bandwidth.

Whenever a large area is to be served by a dual-mode Wi-Fi-DECT network, that area is made up of a plurality of cells, each cell being served by a Wi-Fi radio access point and a DECT radio access point that are preferentially incorporated into the same housing to make installation easier. Wireless terminals are mobile, and consequently it is sometimes necessary to change the Wi-Fi-DECT radio access point during a telephone call, without interrupting that telephone call. Likewise, if a terminal is not in a call, it is sometimes necessary to change the Wi-Fi-DECT radio access point with which that terminal is associated so that it is always associated with the access point that affords the best radio fink quality, in view of later telephone communication and/or data transmission.

The document US 2008/0250142 describes a method for changing a radio access point by choosing from among multiple access points, and potentially changing radio transmission technologies if a radio access point supports multiple radio transmission technologies, so as to meet a criteria defined by a parameter provided by the network. The network and terminals have resource management means comprising, for each of the radio transmission technologies, means for deciding and executing a radio access point change.

The document US 2010/279689 describes a known method combining a radio access point change, then a radio transmission technology change at the new access point, whenever that point supports two radio transmission technologies. For example, it makes it possible to transfer a phone call made via a GSM macro-cell to an LTE femtocell when the terminal gets close to a GSM-LTE dual-mode femto base station. The terminal, which is connected with a GSM macro-cell, detects a GSM pilot signal transmitted by the GSM-LTE dual-mode femto base station. It then decides to transfer communication to that GSM-LTE dual-mode femto base station. It then decides to switch from GSM mode to LTE mode. The network and terminals have resource management means comprising, for each of the radio transmission technologies, GSM and LTE, means for deciding and executing a radio access point change.

In what follows, "not in communication" refers to the state of a Wi-Fi transmitter-receiver that is not transmitting and receiving data packets (This data may be telephone signals). It is still listening to the carrier frequency on which it is receiving data packets. When it needs to transmit a data packet, it listens to the carrier frequency on which it must transmit, and transmits only if it finds it to be free. If the Wi-Fi part of a Wi-Fi-DECT terminal is not in communication, a method for changing the radio access point must nonetheless make it possible to associate that Wi-Fi part with a new Wi-Fi-DECT access point. However, if the Wi-Fi part of that terminal is in communication, that method must further enable a switching of the transmission means used by that communication, in order to keep that communication uninterrupted when the mobile terminal is moved from the area covered by the first radio access point to the area covered by the second radio access point, as these two areas partially overlap.

In what follows, "not in communication" refers to the state of a DECT transmitter-receiver that is not in a call. It is still synchronized to the signals transmitted by the base station. When it is in communication, it occupies a time interval on a carrier transmitted by a base station. If the DECT part of a Wi-Fi-DECT terminal is not in communication, a method for changing the radio access point must nonetheless make it possible to associate that DECT part with a new Wi-Fi-DECT access point. However, if the DECT part of that terminal is in communication, that method must further enable a switching of the transmission means used by that communication, in order to keep that communication uninterrupted when the mobile terminal is moved from the area covered by the first radio access point to the area covered by the second radio access point, as these two areas partially overlap.

The radio access point to which a terminal is associated must be changeable regardless of the state (not in communication, or in communication) of the DECT part of the state (not in communication, or in communication) of the Wi-Fi part of the terminal. If the terminal is not in communication, this is called roaming. If the terminal is in communication, this is called a handover.

In a DECT network, one or more "location areas" are defined. Each DECT location area may comprise one or more cells, meaning that it may be served by one or more radio access points. In an enterprise network, for example, there might be only one location area covered by multiple DECT radio access points. However, there may also be multiple location areas each covered by one or more DECT radio access points.

A method is known that enables a DECT terminal to change DECT radio access points, when it is moved while not in communication or while in communication. This method is described by the standards:

ETSI EN 300, 175-3 part 3
ETSI EN 300, 175-4 part 4
ETSI EN 300, 175-5 part 5

According to a known method, when a DECT terminal is not in a call, it temporarily synchronizes with one of the access points. Whenever it moves and detects that the radio link is better with a new DECT radio access point that is not part of its location area, and that it might lose time synchronization because it has moved too far from its synchronizing access point, it makes a "location request" to the network. This request makes it possible to associate it with a new location area.

When a communication establishment request arrives, all of the DECT radio access points in the location area where the terminal is located are alerted, and they send a signaling message to all terminals. The receiving terminal responds by indicating its exact location, i.e. the access point with which it is associated. The DECT radio access points known to the network for receiving signals intended for that terminal would then relay the signals intended for that terminal to the radio access point to which it is currently associated.

Methods are known that enable a Wi-Fi terminal to change Wi-Fi radio access points while it is not in communication, or during a data communication (or phone call communication). To manage the mobility of Wi-Fi-DECT terminals in a Wi-Fi-DECT wireless telecommunication network, the most immediate solution consists of using in parallel a known method that makes it possible to change DECT radio access points for the DECT part of the terminal (whether in communication or not), and a known method that makes it possible to change Wi-Fi radio access points for the Wi-Fi part of the terminal (whether in communication or not). However, this solution is expensive because known data communication transfer methods in a Wi-Fi network are fairly expensive in terms of hardware:

1) A first known method consists of using a centralized switch, generally a single one, called a Wi-Fi mobility controller, in order to manage the mobility of all Wi-Fi terminals between all access points of a Wi-Fi network. All of the network's Wi-Fi access points must be connected to this switch in order for all the Wi-Fi traffic to pass through that switch. This switch and installing it are expensive.

2) A second known method consists of using a protocol called Mobile Internet Protocol standardized by the IETF (Internet Engineering Task Force). It is intended to allow a user to be mobile from one IP network to another IP network while keeping the connections active and the same IP address for that user. Its implementation for IPv4 is described in RFC 3344 and updated in RFC 4721. Implementation for IPv6 is defined in RFC 3775. It requires two specific servers in each network: a first agent (Home Agent) that saves the information regarding mobile terminals whose permanent address is located in the network in question, and a second agent (Foreign Agent) that saves information about mobile terminals whose permanent address is located in a different network from the network in question. These two servers are expensive.

The purpose of the invention is to propose a less expensive solution than using a known method for changing Wi-Fi radio access points and a known method for changing DECT radio access points.

A first object of the invention is a method for changing the radio access point associated with a terminal in a Wi-Fi-DECT wireless telecommunication network comprising terminals and dual-mode Wi-Fi-DECT radio access points connected to a local network, comprising the following steps for changing dual-mode radio access points associated with a terminal, while a first Wi-Fi mode link and a first DECT mode link have been established between that terminal and a first dual-mode Wi-Fi-DECT radio access point:

applying a known method for deciding on and executing a change of the radio access point associated with that terminal for a first DECT mode link, in order to switch from the DECT part of that first dual-mode Wi-Fi-DECT access point to the DECT part of a second dual-mode Wi-Fi-DECT access point.

and transferring the first Wi-Fi mode link from the Wi-Fi part of that first dual-mode Wi-Fi-DECT access point to the Wi-Fi part of that second dual-mode Wi-Fi-DECT access point, whenever it decides to change the radio access point associated with that terminal for the first DECT mode link, from that first dual-mode Wi-Fi-DECT access point to that second dual-mode Wi-Fi-DECT access point.

The implementation of the inventive method is inexpensive because that method essentially reuses the existing control means to change the DECT access point, and in particular those which order a change in DECT access points during a phone call in DECT mode.

According to one preferred embodiment, in order to change the radio access point associated with a terminal while the Wi-Fi part of that terminal is not in communication and the DECT part of that terminal is not in communication, the method comprises the steps consisting of:

applying a known roaming method to decide to associate the DECT part of that terminal with another DECT access point, and of deciding to associate that terminal's Wi-Fi part with that second dual-mode Wi-Fi-DECT access point when it is decided to associate that terminal's DECT part with that second dual-mode Wi-Fi-DECT access point.

According to one preferred embodiment, to change the radio access point associated with a terminal, the Wi-Fi part of that terminal is communicating and the DECT part of that terminal is communicating, a first DECT mode link and a first Wi-Fi mode link having been established between that terminal and a first dual-mode Wi-Fi-DECT access point, the method comprises the steps consisting of:

applying a known method to decide whether to transfer a communication from one DECT access point to another DECT access point for that first DECT mode link, and transferring the first Wi-Fi mode link from that first dual-mode Wi-Fi-DECT access point to a second dual-mode Wi-Fi-DECT access point, whenever it is decided to transfer the first DECT mode link from that first dual-mode Wi-Fi-DECT access point to that second dual-mode Wi-Fi-DECT access point.

According to one preferred embodiment, in order to transfer the first Wi-Fi mode link from that first dual-mode Wi-Fi-DECT access point to that second dual-mode Wi-Fi-DECT access point, it comprises the steps consisting of:

preserving two links, established in a fixed-line network, all the way to the first dual-mode Wi-Fi-DECT access point and respectively coupled to the DECT mode link and to the Wi-Fi mode link;

and relaying these two links by respectively establishing two new links between the first dual-mode Wi-Fi-DECT access point and the second dual-mode Wi-Fi-DECT access point in the fixed-line network.

One preferred embodiment further consists of replacing a Wi-Fi data transmission link with a DECT data transmission link when that Wi-Fi link is interrupted, until a Wi-Fi data transmission link can be established again.

Another object of the invention is a dual-mode Wi-Fi-DECT access point for implementing this method.

The invention will be better understood and other characteristics will become apparent with the help of the description below and the accompanying figures:

FIG. 1 describes the first phase of an example embodiment of the inventive method.

FIG. 2 depicts the second phase of this example embodiment of the inventive method, during communication.

FIG. 3 depicts the signaling exchanges when a handover is carried out during the transmission of a data sequence from an application server to a mobile terminal, in this example embodiment of the inventive method.

FIG. 4 depicts the signaling exchanges when a handover is carried out during the transmission of a data sequence from a mobile terminal to an application server, in this example embodiment of the inventive method.

The case in which the Wi-Fi part and the DECT part are both not in communication is the simplest one, but two distinct cases must be recognized:

1) The radio access points are configured such that each location area comprises only one Wi-Fi-DECT radio access point. In this case, the terminal changes both its location area and its access point every time it has detected an access point that allows a better DECT radio link.

The terminal automatically makes a location request whenever it detects that said access point allowing a better DECT radio link belongs to a new location area. Whenever the terminal changes its location area, the new access point asks the network for the identity of the access point that will serve to access the outside network, for that terminal, and that terminal will thereby know which access point will be able to relay the next communication (in both directions).

2) The radio access points are configured so that a location area may comprise multiple Wi-Fi-DECT radio access points. In this case, the terminal does not necessarily change location area every time that it has detected an access point enabling a better DECT radio link.

The terminal's behavior must, in this case, be modified, compared with the conventional behavior of a DECT terminal, so that it makes a location request every time that it detects a better access point, even if its location area is not actually changing. Whenever the terminal changes its location area, the new access point asks the network for the identity of the access point that will serve as that terminal's access to the outside network. This terminal will thereby know which access point will be able to relay (in both directions) the next communication.

In the event that the Wi-Fi part and the DECT part are both not in communication, the inventive method consists of applying a known roaming method in order to decide to associate that terminal's DECT part with another DECT access point; and of deciding to associate that terminal's Wi-Fi part with that second dual-mode Wi-Fi-DECT access point whenever it is decided to associate that terminal's DECT part with that second dual-mode Wi-Fi-DECT access point (AP2).

The situation in which the Wi-Fi part and the DECT part are both in communication is more complex.

In the example embodiment depicted in FIG. 1, an enterprise telecommunication network, of the Wi-Fi-DECT type, comprises terminals such as the mobile terminal PP, which is of the dual-mode Wi-Fi-DECT type, and dual-mode Wi-Fi-DECT radio access points, AP1 and AP2. These access points are all connected to an Ethernet local area network that is not depicted. This local network is conventionally connected to a public telephone network (not depicted) by a gateway that ensures conversion between the protocols used in the local area network and the protocols used in the public telephone network. Additionally, this local area network is linked, by another gateway, to the Internet network (not depicted).

These access points AP1 and AP2 each comprise: a DECT radio interface, a Wi-Fi radio interface, and an IP interface (to communicate with another network using Internet protocol). At the moment in question, the DECT part of the mobile terminal PP is connected by a DECT radio link, DL1, to the access point AP1. A telephone call communication in DECT mode is established between the mobile terminal PP and a remote telephone terminal T. It is supported by the DECT radio link DL1, the access point AP1, and a fixed-line telephone link LT over the local area network and the public telephone network (Communication could also take place with a mobile terminal, via a public mobile telephony network, or simply to another enterprise network of the terminal in question).

Simultaneously, a data communication, in Wi-Fi mode, is established between the mobile terminal PP and an application server AS. In this example, it is supported by a Wi-Fi radio link, WL1, the access point AP1, and a fixed data transmission link LA, via the Ethernet local area network and via the Internet (In other examples, the application server could be in the enterprise network in question).

During these communications, the mobile terminal PP is moved. It arrives at the edge of the access point's AP1 coverage area, and enters the access point's AP2 coverage area, with these two areas partially overlapping.

FIG. 2 depicts the second phase of this example embodiment of the inventive method. At the moment in question, the mobile terminal PP asks the access point AP2 to transfer the telephone call communication and the data communication that are underway to that access point AP2. The access point AP2 applies a known method for transferring from one DECT access point to another DECT access point, for a telephone call communication in DECT mode. When the access point AP2 decides to transfer the telephone call communication in DECT mode, from access point AP1 to access points AP2, that access point AP2 also decides to transfer data communication, from the access point AP1 to the point AP2. To do so, it orders:

the establishing of a link LT' between the access points AP1 and AP2 in order to relay the telephone link LT to the access point AP2;

the establishing of a link LA' between the access points AP1 and AP2 to relay the data transmission link LA to the access point AP2.

Naturally, the links LT and LA are maintained. The access point AP1 then orders that the links DL1 and WL1 that connected it to the mobile terminal PP be released.

The coverage of a dual-mode radio access point is not exactly the same in Wi-Fi mode as in DECT mode. It is stronger in DECT mode due to the higher transmission power. Therefore, sometimes the Wi-Fi link may be interrupted before the transfer to another DECT-Wi-Fi access point has been decided, because it is decided based on the quality of the DECT signals received. When this happens, a preferred embodiment of the inventive method consists of replacing the Wi-Fi data transmission link DL1 by a DECT data transmission link until the Wi-Fi data transmission link can be established again, meaning when the transfer has been decided for the DECT telephone link. It is known to transmit data over a DECT link by means of a tunnel using the Internet protocol. The available bandwidth is then much lower than over a Wi-Fi link, but this ensures a backup link.

This data transmission over a DECT data transmission link may also be activated whenever an access point detects that the data to be transmitted require only low bandwidth, less than or equal to that available on a DECT data transmission link. This makes it possible to reduce the power consumption of that particular mobile terminal's Wi-Fi transmitter-receiver.

FIG. 3 depicts the signaling exchanges whenever a handover is carried out during the transmission of a data sequence from the application server AS to the mobile terminal PP, in this example embodiment of the inventive method. The successive operations are as follows:

201: The application server AS sends a data packet to the access point AP1 via the fixed line LA.

202: The access point AP1 sends the application server AS a receipt-acknowledged message, via the fixed line LA.

203: The access point AP1 sends the data packet to the mobile terminal PP over the Wi-Fi data transmission link DL1.

204: The mobile terminal PP sends a receipt-acknowledged message to the access point AP1 over the Wi-Fi data transmission link WL1.

205: The mobile terminal PP detects that transferring the DECT link to the access point AP2 is necessary. It establishes the DECT link DL2 and the Wi-Fi link WL2, and sends a handover request message to the access point AP2 over the DECT link DL2.

206: The access point AP2 sends a transfer confirmation message to the mobile terminal PP over the DECT link DL2.
207: The mobile terminal PP sends a transfer acceptance message to the access point AP2 over the DECT link DL2.
208: The access point AP1 sends a search message within the local area network to request which access point is currently on the DECT link with the mobile terminal PP that is requesting a transfer.
209: The access point AP2 answers this request by giving its IP address to the access point AP1.
210: The access point AP1 sends the mobile terminal PP a message indicating that it will release the DECT link DL1, over the DECT link DL1.
211: The mobile terminal PP sends a receipt-acknowledged message to the access point AP2 over the DECT link DL1. Next the DECT link DL1 is released by the access point AP1.
212: The application server AS sends a new data packet to the access point AP1.
213: The access point AP1 sends the application server AS a receipt-acknowledged message.
214: The access point AP1 retransmits the data packet to the access point AP2, i.e. it relays the data transmission link LA by extending it using a data transmission link LA', over the local area network, to the access point AP2.
215: The access point AP2 sends the application server AP1 a receipt-acknowledged message.
216: The access point AP2 sends the data packet to the mobile terminal PP over the Wi-Fi data transmission link WL2.
217: The mobile terminal PP sends a receipt acknowledgement message to the access point AP2 over the Wi-Fi data transmission link WL2.

It should be noted that operations 205 to 211, denoted DH, are constituted by conventional DECT handover operations.

FIG. 4 depicts the signaling exchanges when a handover is carried out during the transmission of a data sequence from the mobile terminal PP to the application server AS, in this example embodiment of the inventive method. The successive operations are as follows:

301: The mobile terminal PP sends a data packet to the access point AP1 over the Wi-Fi data transmission link WL1.
302: The access point AP1 sends a receipt-acknowledged message to the mobile terminal PP over the Wi-Fi data transmission link WL1.
303: The access point AP1 retransmits the data packet to the application server AS, via the fixed data transmission link LA.
304: The application server AS sends a receipt-acknowledged message to the access point API, via the fixed line LA.
305: The mobile terminal PP detects that transferring the DECT link to the access point AP2 is necessary. It establishes the DECT link DL2 and the Wi-Fi link WL2, and sends a handover request message to the access point AP2 over the DECT link DL2.
306: The access point AP2 sends a transfer confirmation message to the mobile terminal PP over the DECT link DL2.
307: The mobile terminal PP sends a transfer acceptance message to the access point AP2 over the DECT link DL2.
308: The access point AP1 sends a search message within the local area network to request which access point is currently on the DECT link with the mobile terminal PP that is requesting a transfer.
309: The access point AP2 answers this request by giving its IP address to the access point AP1.
310: The access point AP1 sends the mobile terminal PP a message indicating that it will release the DECT link DL1, over the DECT link DL1.
311: The mobile terminal PP sends a receipt-acknowledged message to the access point AP2 over the DECT link DL1. Next the DECT link DL1 is released by the access point AP2.
312: The mobile terminal PP sends a new data packet to the access point AP2 over the Wi-Fi link WL2.
313: The access point AP2 sends a receipt-acknowledged message to the mobile terminal PP over the Wi-Fi link WL2.
314: The access point AP2 retransmits the data packet to the access point API, i.e. it relays the data transmission link LA by extending it using a data transmission link LA' to the access point AP1.
315: The access point AP1 sends the application server AP2 a receipt-acknowledged message.
316: The access point AP1 sends the data packet to the application server AS via the fixed link LA.
317: The application server AS sends a receipt-acknowledged message to the access point AP2, via the fixed line LA.

It should be noted that operations 305 to 311, denoted DH, are constituted by conventional DECT handover operations.

The invention claimed is:

1. A method for changing the radio access point associated with a dual mode Wi-Fi-DECT radio terminal, within a Wi-Fi-DECT wireless telecommunications network comprising dual-mode Wi-Fi-DECT radio terminals and dual-mode Wi-Fi-DECT radio access points connected to a local area network; comprising the following in order to change the dual-mode radio access point associated with a dual mode Wi-Fi-DECT radio terminal, when a first Wi-Fi mode link and a first DECT mode link have been established between that dual mode Wi-Fi-DECT radio terminal and a first dual-mode Wi-Fi-DECT radio access point:

a second dual-mode Wi-Fi-DECT access point applying a known method for deciding on and executing a change of the radio access point associated with that dual mode Wi-Fi-DECT radio terminal for a first DECT mode link, in order to switch the DECT part of that first dual-mode Wi-Fi-DECT access point to the DECT part of said second dual-mode Wi-Fi-DECT access point;

and said second dual-mode Wi-Fi-DECT access point transferring the first Wi-Fi mode link from the Wi-Fi part of that first dual-mode Wi-Fi-DECT access point to the Wi-Fi part of that second dual-mode Wi-Fi-DECT access point, whenever it decides to change the radio access point associated with that dual mode Wi-Fi-DECT radio terminal for the first DECT mode link, from that first dual-mode Wi-Fi-DECT access point to that second dual-mode Wi-Fi-DECT access point.

2. A method according to claim 1, wherein, in order to transfer the first Wi-Fi mode link from that first dual-mode Wi-Fi-DECT access point to that second dual-mode Wi-Fi-DECT access point, it comprises:

preserving two links, established in a fixed-line network, connected to the first dual-mode Wi-Fi-DECT access point and respectively coupled to the DECT mode link and to the Wi-Fi mode link;

and relaying these two links by respectively establishing two new links between the first dual-mode Wi-Fi-DECT access point and the second dual-mode Wi-Fi-DECT access point in the fixed-line network.

3. A method according to claim 1, further consisting of replacing a Wi-Fi data transmission link with a DECT data transmission link whenever that Wi-Fi link is interrupted, until a Wi-Fi data transmission link can be established again.

4. A dual-mode Wi-Fi-DECT access point, for a Wi-Fi-DECT wireless telecommunication network, comprising dual mode Wi-Fi-DECT radio terminals and dual-mode Wi-Fi-DECT radio access points, wherein it comprises:—a DECT part and a Wi-Fi part for simultaneously establishing a first DECT mode link and a first Wi-Fi mode link with a dual mode Wi-Fi-DECT radio mobile terminal;—a control module to apply a known method for changing the radio access point associated with a dual mode Wi-Fi-DECT radio terminal, for a first DECT mode link, to switch from the DECT part of said dual-mode Wi-Fi-DECT access point to the DECT part of a second dual-mode Wi-Fi-DECT access point, and a control module to transfer the first Wi-Fi mode link from the Wi-Fi part of said dual-mode Wi-Fi-DECT access point to the Wi-Fi part of said second dual-mode Wi-Fi-DECT access point, whenever it is decided to transfer the first DECT mode link from said dual-mode Wi-Fi-DECT access point to that second dual-mode Wi-Fi-DECT access point.

5. A dual-mode Wi-Fi-DECT access point, according to claim 4, wherein the control module for transferring the first Wi-Fi mode link from that first dual-mode Wi-Fi-DECT access point to a second dual-mode Wi-Fi-DECT access point, comprises a training module for:

preserving two links, established in a fixed-line network, connected to the first dual-mode Wi-Fi-DECT access point and respectively coupled to the DECT mode link and to the Wi-Fi mode link;

and relaying these two links by respectively establishing two new links between the first dual-mode Wi-Fi-DECT access point and the second dual-mode Wi-Fi-DECT access point in the fixed-line network.

6. A dual-mode Wi-Fi-DECT access point, according to claim 4, further comprising a control module for replacing a Wi-Fi data transmission link with a DECT data transmission link whenever that Wi-Fi link is interrupted, until a Wi-Fi data transmission link can be established again.

\* \* \* \* \*